Feb. 2, 1971 R. G. NEVILLE 3,560,931

CIRCUITRY TO IMPROVE RESOLUTION IN CHARACTER RECOGNITION

Filed March 26, 1969 2 Sheets-Sheet 1

INVENTOR
RICHARD G. NEVILLE

BY

Kane, Dalsimer, Kane, Sullivan & Smith
ATTORNEYS

CIRCUITRY TO IMPROVE RESOLUTION IN CHARACTER RECOGNITION

Filed March 26, 1969 2 Sheets-Sheet 2

United States Patent Office 3,560,931

Patented Feb. 2, 1971

3,560,931
CIRCUITRY TO IMPROVE RESOLUTION IN CHARACTER RECOGNITION

Richard G. Neville, Endicott, N.Y., assignor to International Business Machines Corporation, Armonk, N.Y., a corporation of New York Filed Mar. 26, 1969, Ser. No. 810,703
Int. Cl. G06k *9/04;* G11b *5/00*
U.S. Cl. 340—146.3 11 Claims

ABSTRACT OF THE DISCLOSURE

This disclosure is directed to an improved character recognition system. In particular, it utilizes a parallel operating multi-channel digital-type of detector system which provides compensation for any variations in alignment of the character-to-scanner registration. The system operates through the use of scanners each having a quantizer circuit associated therewith. Suitable summing circuits are arranged to receive and transmit to the quantizer the output of adjacent scanning operations which collectively overcome any mis-registration conditions of any character relative to any scanning units.

CHARACTER RECOGNITION SYSTEM

Figure 1A:
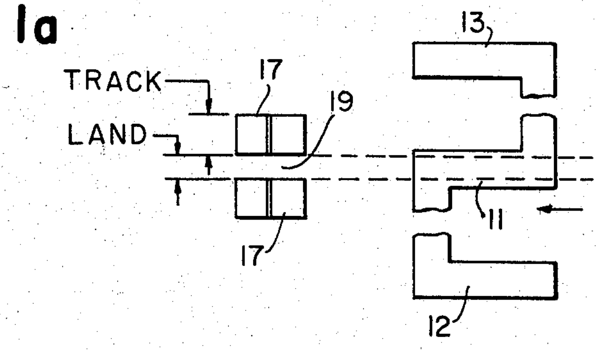

This invention is directed to a character recognition or reading system.

In particular, the invention is related to a parallel operating multi-channel digital type of detector system where provisions are made for overcoming difficulties in the detection of bars or traces of various characters appearing upon a record medium. In particular, the invention is so constituted that even with variations in character line width and variations in character-to-scanner registration, recognition will still be readily achieved.

Various types of character recognition systems have been developed in the past. The present invention is intended to improve upon the accuracy of response and identification over prior art systems and yet to be generally compatible and usable with prior systems so that even still greater accuracy of reading can be had.

Generally speaking, character recognition systems involve a transporting of the record bearing element relative to some pickup or scanning unit. This is to say that if the record element or medium bearing the indicia is moved relative to the scanning unit, there will be a resultant production of signal outputs indicating the presence or absence of a character in the particular location at which the scanning instantaneously occurs. As an example of one of the uses of recognition systems of the character herein to be described, reference may be made to the identification of bank checks wherein identifying numbers, usually signifying the bank involved, dollar amount and the customer's number, are usually printed or otherwise applied in magnetic form along one edge of the check.

The characters for recognition usually are in the form of either printed numbers or letters placed upon the background of the record medium as aforesaid. Relative movement between this record medium and the scanning unit, which, in the case of magnetic ink characters, comprises a magnetic pickup reading head structure, can be provided in any desired fashion. The significant factor is to cause the record to move past all of the magnetic heads of the structure, thereby to produce the development of a signal output each time the record carriers move beneath the gap of any of the magnetic reading head elements.

For practical purposes, the magnetic read heads are usually arranged in a row or column so that when relative movement occurs between the medium carrying the characters which are to be identified and one or more of the various magnetic heads, a signal-producing electromagnetic effect results. The magnetic read heads are normally adjacent to each other and naturally are of finite dimensions. Each is capable of resolving the presence or absence of any magnetic impression upon the record carrier in the region where registry between the heads and the record occurs. A problem commonly encountered is that of distinguishing between desired types of output from the magnetic read heads as against other signal information which might result in some form of undesired signal due to commonly experienced difficulties such as noise, crosstalk or other interference.

The general and certain broad functions and features which form the background of this invention are set forth by U.S. Letters Patent No. 3,165,717, of Jan. 17, 1965, issued to Eckelman et al. As in the said patent, here also it will be understood that a write head which is powered from a suitable alternating current source of suitable frequency is positioned ahead of the read heads to provide an energizing signal such that a selected number of cycles of the applied energy occur during the time that each line of the recorded image signal is passed adjacent to one of the read heads in the lower column.

Also, as in the patent above named, the read heads will be understood as being constituted by any even number placed adjacent to each other and arranged to span the full width (or height) of all characters on the record. By reason of symmetry in arrangement, only two adjacent read heads will be discussed in any substantial detail herein and the write head will be shown only in a generally schematic form as these are clearly set out in the arrangement of the Letters Patent named.

Usually, where the information to be read out is taken from indicia placed upon checks, for instance, the stylized characters which are employed are considered as having one or more increments of about 0.013 inch in width. Under these conditions, it is customary to advance the record medium past the read head at such a rate that the line increments pass each read head within a preselected time interval, for example about 65 microseconds each. For these conditions, it can be assumed that a 30 kHz. energizing signal is employed and if this be done, there will occur two cycles of 30 kHz. signal during the passage of each line increment width past each record head as was also explained in the patent above named.

Since the parallel reading heads used in the multi-gap recognition systems have a predetermined width, and since some predetermined spacing between the heads must exist for windings, shielding, etc., it is apparent that difficulties can exist in properly detecting the horizontal bar portions of the two heads adjacent the land. A resultant loss in the multi-gap head assembly has an effective pickup width or "track" of 11.5 mils and 6 mil land or between-track spacing. Then if a horizontal character bar of 10 mils width should be centered on the land, only 4 mils will pass under the effective head width, or 2 mils under each of the two heads adjacent the land. A resultant loss in signal amplitude may result in the loss of detection or scanning of the horizontal bar portion of the characters.

Registration of the horizontal bars with respect to the reading tracks varies with variations in printing, document cutting, and document transport. Width of the lines and signal amplitude will vary due to ink and printing variations.

By the present invention these difficulties are largely eliminated by suitably combining the outputs from adjacent sensing channels. Usually the sensors are coupled to a quantizer directly through a suitable rectifier and threshold limiter and amplifier. A connection of this character is adequate when each of the separate adjacent and parallely positioned pickup or read heads is precisely aligned with the imprinted message. However, where compensation for shifts is to be provided in accordance with this invention, the same quantizer is coupled into adjacent channels so that some signal from each channel after suitable inversion and addition can be supplied through an AND circuit along with the output of the adjacent channels. The result is then representative of the signal sought from the previous channel to such an extent that if all of the inverted outputs from the two adjacent channels and the signal energy of the aforesaid channel happen to be concurrently present, these signals or the desired signal alone are sufficient to activate a suitable OR circuit whose output is directed and connected to a quantizer of any desired form.

In this type of operation the output signals in adjacent channels provide an input to an analog summing circuit. Then by way of the three-way AND circuit above mentioned, a signal output from this circuit can serve as the input to the quantizer at each time each adjacent channel lacks the desired value.

The connections and operations which will herein be described are so arranged that any signals which result because of split or misregistered horizontal lines which heretofore have generally been lost, will be detected, but crosstalk signals will continue to be rejected as desired. The advantages of the invention are achieved largely by summing the signals from adjacent channels and utilizing the summed output in those conditions where the associated single channel input is inadequate.

The present invention, accordingly, has as one of its main objects that of providing for improved reliability by improved detection of the horizontal lines of characters.

Another object of the invention is to provide an improved arrangement for combining signals from adjacent channels in a multi-channel character recognition system, in case the input from a single associated channel is inadequate for the required output.

The foregoing and other object, features and advantages of the invention will be apparent from the following more particular description of a preferred embodiment as illustrated in the accompanying drawings.

Figure 3:
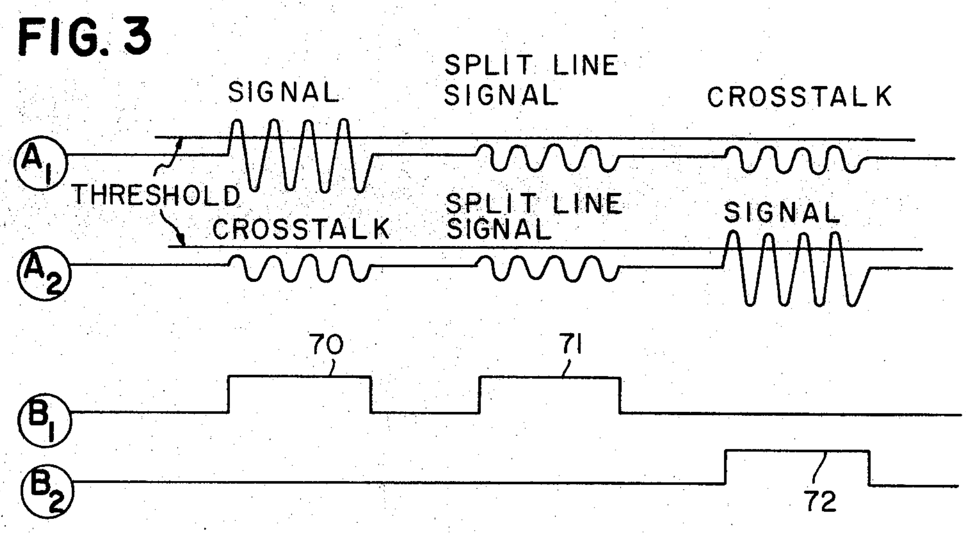
Figure 1B:
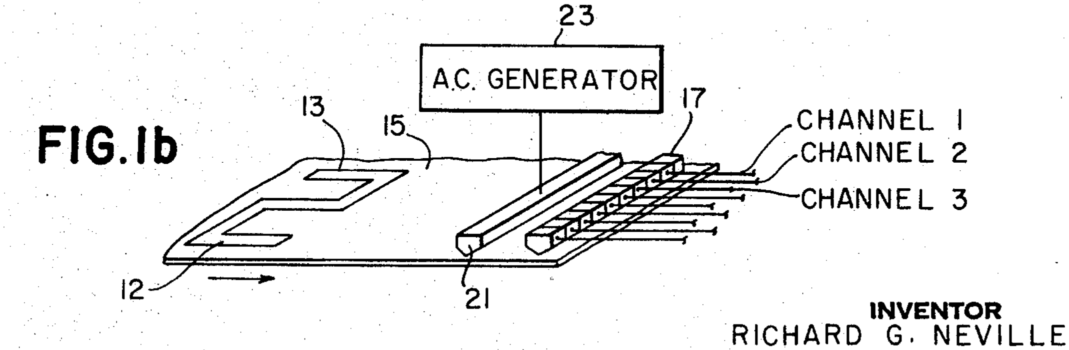
Figure 2:
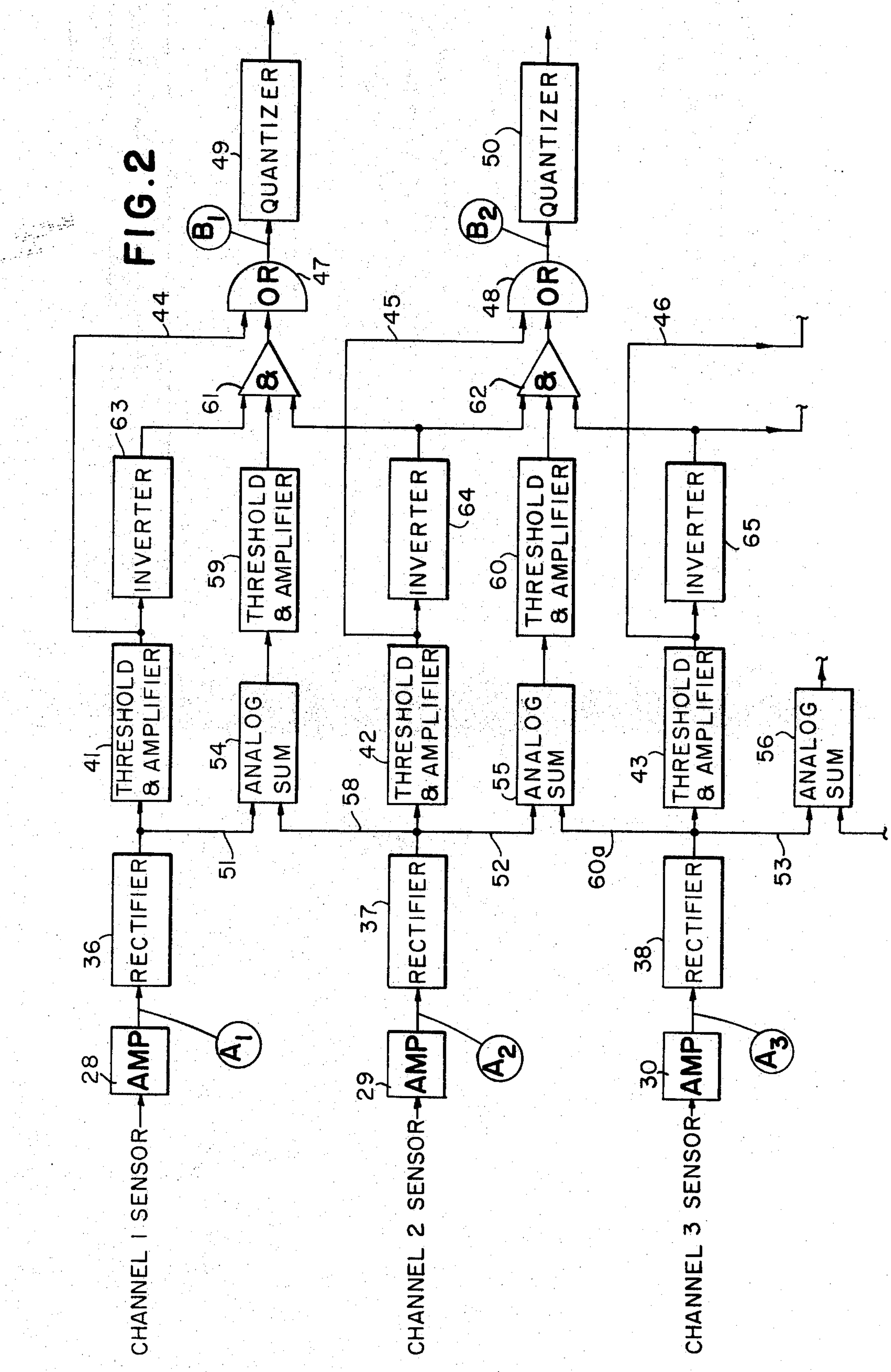

In the drawings:

FIG. 1*a* is a showing of an assumed arrangement of one character with its central horizontal portion centered between two adjacent magnetic read-out heads with the assumed direction of movement of the character bearing surface relative to the pickup heads being indicated by the arrow;

FIG. 1*b* is a schematic showing to supplement FIG. 1*a* and show a plurality of pickup heads, together with the write head and the output connections;

FIG. 2 is a schematic showing of circuitry adapted for the utilization of the outputs from the read-in heads of FIG. 1*b* showing nevertheless only three of the multiplicity of channels of FIG. 1*b*; and FIG. 3 is a schematic illustration of the signal waveforms found in the circuitry of FIG. 2 at different points thereof.

Now referring to the drawings for a further understanding of the invention, it is recognized that parallel reading systems have some difficulty in detecting horizontal bars such as the horizontal sections 11, 12 or 13 of such numerals as that shown as "2" which are assumed to be inscribed on some suitable character-bearing surface 15 (see FIG. 1*b*) which may be in the form of a card, sheet or other document forming means.

Consider now that the character-bearing surface 15 on which magnetic characters, such as the numeral 2, are suitably written should have a horizontal bar portion shown by any of the horizontal portions 11, 12 or 13 in the form of a horizontal bar of about ten mils width. If this bar area should be centered over the land area between the reading tracks, it is apparent immediately that only 2 mils of the magnetic printing will be over the region beneath each of the magnetic read heads 17. Signal output from each read head is developed each time the character-bearing surface 15 carrying the magnetically printed character material moves beneath the magnetic head. Whenever the horizontal bar portion of the character is centered between the magnetic pickup head regions 17 a signal output of only reduced amplitude can be obtained from each of these heads 17. Consequently, this causes in many instances the inability of detecting the horizontal bars.

Even if the signal or character to be impressed upon the character-bearing surface 15 should be such that the translation thereof into electrical signal energy should be through the use of optical recognition systems, a similar problem would occur.

While a system which tends to increase resolution by decreasing the land and/or track width of the reading head is possible through various arrangements, nonetheless, as a general rule, such increased resolution usually results in many undesirable technical and cost problems.

If reference is made for the moment to FIG. 1*b*, it will be recognized that the magnetic read heads generally shown at 17 could be staggered, for instance, rather than as shown in a row or column as in FIG. 1*b*. The cost of such an approach, however, would normally be quite substantial for the added heads and the amplifiers and, further than this, expensive additional delay circuits would be required because of different times when different portions of the separate characters would be within the region of the pickup heads.

Consequently, it is usually desirable and cost-saving to arrange the magnetic read out heads 17 in the general column or row fashion, such as that schematically shown by FIG. 1*b*. Each of the pickup heads then can provide an output signal, such as those shown for channels 1, 2, 3 etc. of FIG. 2, in which no delay or phasing problems are present.

Referring again for the moment to FIG. 1*b*, the character-bearing surface 15 which is assumed to carry the numerical letter or other indication, as shown by FIG. 1*a*, and which may be provided with the line portions 11, 12 and 13, is assumed to be moved (by any suitable device, which is not shown as it can be of any known form) in the direction shown by the arrow relative to the read-out heads 17. When so moved, the character-bearing surface is passed under the schematically represented write head 21. This head is connected to a schematically represented A.C. generator 23 by any desired form of conductor. The A.C. generator 23 may be of any conventional type adapted to develop a relatively high frequency such that, for instance, each traversal of any portion of the character formed on the character-bearing surface 15 moves at such a rate that there will be in most instances at least two cycles for each marking path.

Considering FIG. 2 of the drawings now, the output from the various read heads for channels 1, 2, 3, etc., are applied as input signals to the amplifiers 28, 29 and 30, etc., as shown, and other similar amplifiers (not shown) which are connected to the remaining channels, not shown in FIG. 2 The amplified output from each of the amplifiers 28, 29, 30, etc., is fed by way of indicated connections to the rectifiers 36, 37 and 38, etc., which input signals are designated respectively as $A_1$, $A_2$, $A_3$, etc. These appear as signals which are also identified in FIG. 3 by the same letter designation, although in FIG. 3 only the input signals for channels 1 and 2 are shown.

This constitutes then the signal from the sensor or read-in heads 17 which is constituted by the various multi-track magnetic head circuits which feed into the designated components of FIG. 2, such as the amplifier and the full wave rectifiers. One output of each rectifier, such as 36, 37 or 38, is directed into a threshold and amplifier circuit, conventionally represented as at 41, 42 and 43. Various forms of such amplifiers may be used, but illustratively one suitable form which is recognized in the art as desirable for setting a suitable output threshold value (see curves of FIG. 3) and at the same time provide amplification is illustrated in the "Handbook of Operational Amplifier Applications" published in 1963 by Burr-Brown Research Corporation of Tucson, Ariz. One suitable form is illustrated, for example, on page 45 of the said handbook. Because of this prior art knowledge, the mere diagrammatic showing of the component is resorted to in this application for the sake of simplicity and because the understanding of the general operation of this one component is clear and has been known for some time.

One output conductor from each threshold and amplifier circuit 41, 42, 43, for instance, is directed by way of connection 44, 45 and 46 to constitute one input of an OR circuit 47 or 48. The OR circuit output is supplied to a quantizer, schematically shown at 49 and 50, which may be of the form disclosed in the referenced Eckelman et al. patent.

According to the present invention, a second portion of the output of the rectifiers, such as 36, 37 and 38, is supplied by way of the indicated conductors 51, 52 and 53 to the analog summing circuits schematically represented at 54, 55 and 56. These analog summing circuits are also generally known in the art, which accounts for the conventional and schematic illustration, but for further illustration, reference also may be made to the Burr-Brown handbook above mentioned, and particularly to the forms of analog summing circuits which are shown on its pages 16 through 18 and 59 thereof, for instance.

Likewise, the output from the rectifiers 37 and 38 (and the rectifiers following but not shown here) are supplied through the conductors 58 and 60*a* and also into the analog summing circuits, such as 54 and 55. The voltages are summed by applying the signals to the same input amplifier.

Still further, the output of the analog summing circuits 54, 55, 56, etc., may be supplied to a threshold and amplifier circuit such as those schematically illustrated at 59 and 60, for instance, whose outputs feed as one input to an AND circuit, illustrated for two channels at 61 or 62. The outputs from the threshold and amplifier circuits 41, 42 or 43, for instance, are also directed not only to the OR circuits, as already mentioned, but supply the AND circuits 61 and 62 through suitable inverter circuits like 63, 64, 65.

Thus, the input to each of the AND circuits 61 and 62, for instance, is similar in that it is similarly derived. The input to the AND circuit 61 thus comprises the inverted output of the threshold and amplifier circuit 41, as well as the inverted output of the threshold and amplifier circuit 42, and in addition, the output of the threshold and amplifier circuit 59.

When the AND circuit 61 is energized by all of its inputs, it feeds an output to the OR circuit 47 at which time it is controlling the OR circuit because the input derived directly from the threshold and amplifier circuit 41 is insufficient to serve as an energizing medium. This wave input and the resultant output has been shown in FIG. 3 with the threshold having been set at the level indicated to take care of possible crosstalk, noise and the split line signals. The final signal at $A_1$, as it is impressed through the threshold and amplifier circuit 41 is represented as being adequate to provide an output from the OR circuit. The split line signal present at both $A_1$ and $A_2$ of itself is insufficient to energize the output, but with two such signals summed together, it can be seen that there is developed an output from the OR circuit which also will be of the form represented by signal outputs such as $B_1$ and $B_2$.

Illustratively, the signal inputs at $A_1$ and $A_2$, after summing, provide pulse signal outputs $B_1$ at the position 71. The signals at $A_1$ or $A_2$ will provide a similar output of themselves in the regions 70 or 72. Where both crosstalk and signal levels are present, it will be seen that the crosstalk is below the threshold signal level and consequently the signal is controlling. For the split line signal where it is important that a signal output be developed, such as shown for instance on the line $B_1$ at 71, the output results in the fashion indicated. Even though the signals on $A_1$ and $A_2$ are both below the threshold value, their sum will be sufficiently great to provide the output indicated at 71.

In this showing, the output of the three-way AND circuit is always ORed with the preceding channel which results in the detected signal always being put in the output channel associated with the preceding input channel. This is not a problem with the multi-track magnetic character recognition system. Should more precise location be desired, a differential amplifier obviously can be used to determine which of the two signals supplied to the summing circuit is the larger and then through the control of a suitable gate, supply the output to that channel that had the larger of the two input signals.

From what is shown, it is clear the invention has been particularly shown and described with reference to a preferred embodiment thereof, but it will be understood by those skilled in the art that various changes in form and details may be made therein without departing from either the inventive spirit or scope.

Having now described the invention, what is claimed is:

1. Character recognition circuitry to increase resolution comprising
- means for scanning characters in a plurality of adjacent paths related to the characters and producing therefrom separate signals from each scanning means,
- a quantizer circuit associated with each separate scanning means,
- a summing circuit connected to receive as its input the output of adjacent scanning means and to provide therefrom a combined output signal,
- an inverting circuit connected with each separate scanning means independently of the summing circuit, thereby to invert the developed signal from each separate scanning means,
- an AND circuit having separate inputs comprising those of the inverted outputs of adjacent scanning means and the summed signal means, and
- a circuit connected between the output of each scanning path on the one hand and the combined inputs to the AND circuit on the other hand to supply input signals to the associated quantizer during periods of energization of the individual scanning means or the development of output signals from the combining AND circuit.

2. The circuit claimed in claim 1 comprising, in addition, a rectifier means for each scanning means supplying a rectified scanned signal to all of the controlling circuits.

3. The circuit claimed in claim 2 comprising, in addition, a threshold circuit in each signal path to determine the input signal level required to provide an output.

4. The circuit claimed in claim 3 wherein the input to the quantizer is provided at times when an output signal is present from the AND circuit independently of the amplitude of the independent scanning inputs.

5. The circuit claimed in claim 4 comprising means to provide at its output signals exceeding a preset of signal from each adjacent scanning input at times when an output signal is developed at the output of the summing circuit.

6. Character recognition circuitry to increase resolution comprising
- means for scanning characters in a plurality of adjacent paths related to the characters and producing therefrom separate signals from each scanning means,
- rectifying means for each individual scanning signal produced,
- means to set a threshold value for the rectified signals, a quantizer circuitry associated with each separate scanning means, a summing circuit connected to receive as its input the rectified output of adjacent scanning means and to provide therefrom a summed output signal, a threshold circuit connected to receive at its input the summed output of the summing circuit and to provide at its output signals exceeding a preset threshold value, an inverting circuit connected with each separate scanning means independently of the connection from the first named threshold limiting means, thereby to invert the developed signal from each separate scanning means, an AND circuit having separate inputs comprising those of the inverted outputs of adjacent scanning means and the threshold limited signals of the analog summing means, and a circuit connected between the threshold limiting means of each scanning path and the combined AND circuit of adjacent channels to supply input signals to the quantizer during periods of energization of either individual scanning means or at times when output signals are developed from the combining AND circuit for the inverted signals of adjacent channels and the threshold limited analog summed signals of adjacent signal channels.

7. Character recognition circuitry to increase resolution comprising a plurality of adjacent circuits, each having a scanning sensor, to provide a signal output at time periods of scanning indicia at the scanner region where characters are scanned in a plurality of adjacent paths each related to the other, means for rectifying each individual signal produced from the scanning, a quantizer circuit associated with each separate scanning means, means to connect each rectified signal path to the quantizer, means to set a threshold value which the rectified signals must exceed to pass to the quantizer directly, an analog summing circuit connected to receive as its input the rectified signal output of adjacent scanning paths and to provide therefrom a summed output signal, a threshold circuit connected to receive at its input the summed output of the summing circuit and to provide at its output signals exceeding a preset threshold value, an inverting circuit also connected to be supplied with each separate scanning signal independently of the connection from the first named threshold limiting means to the quantizer, thereby to invert each developed scanning signal, an AND circuit having a plurality of separate input circuits comprising those providing the inverted scanning signal forming the outputs of adjacent scanning paths and the threshold-limited signals of the analog summing means, and a circuit connected between the threshold limiting means of one of the adjacent scanning paths and the combined AND circuit output of adjacent channels.

8. The character recognition circuitry of claim 1 wherein each of the plurality of characters is applied as a magnetic indication.

9. The circuitry claimed in claim 8 wherein the scanning means comprises a plurality of magnetic signal translating heads.

10. The character recognition circuitry claimed in claim 6 wherein the characters each comprise a magnetic representation and the scanning means comprises magnetic pickup heads.

11. The character recognition circuitry and system as in claim 7 wherein the signal output results from scanning a magnetic representation and each scanning sensor comprises a magnetic scanning head.

References Cited

UNITED STATES PATENTS

| | | | |
|---|---|---|---|
| 2,709,204 | 5/1955 | Holmes | 179—100.2 |
| 3,126,535 | 3/1964 | Streeter | 340—174.1 |
| 3,246,307 | 4/1966 | Stanley | 179—100.2 |
| 3,258,750 | 6/1966 | Shew | 340—174.1 |
| 3,263,031 | 7/1966 | Welsh | 179—100.2 |
| 3,293,627 | 12/1966 | Auyang et al. | 179—100.2 |
| 3,404,392 | 10/1968 | Sordello | 340—174.1 |
| 3,484,747 | 12/1969 | Nuncey | 340—146.3 |

THOMAS A. ROBINSON, Primary Examiner

U.S. Cl. X.R.

179—100.2; 340—174.1

PO-1050
(5/69)

UNITED STATES PATENT OFFICE
CERTIFICATE OF CORRECTION

Patent No. 3,560,931 Dated February 2, 1971

Inventor(s) Richard G. Neville

It is certified that error appears in the above-identified patent and that said Letters Patent are hereby corrected as shown below:

Column 6, line 64, after "provide" delete "at its output signals exceeding a preset" and insert --an input to the quantizer circuit i1 the absence".

Signed and sealed this 25th day of May 1971.

(SEAL)
Attest:

EDWARD M.FLETCHER,JR.
Attesting Officer

WILLIAM E. SCHUYLE
Commissioner of Pa